(12) United States Patent
Kitagawa et al.

(10) Patent No.: US 10,792,748 B2
(45) Date of Patent: Oct. 6, 2020

(54) WELDING DEVICE

(71) Applicant: MAYEKAWA MFG. CO., LTD., Tokyo (JP)

(72) Inventors: Hisashi Kitagawa, Tokyo (JP); Yoshiyuki Oomasa, Tokyo (JP); Hideki Shudai, Tokyo (JP); Yoshihiko Ueno, Tokyo (JP); Daisuke Miyazaki, Tokyo (JP); Masato Takeda, Tokyo (JP); Toshinori Ohtomo, Tokyo (JP); Toshikazu Kamae, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 145 days.

(21) Appl. No.: 16/313,155

(22) PCT Filed: Oct. 7, 2016

(86) PCT No.: PCT/JP2016/080005
§ 371 (c)(1),
(2) Date: Dec. 26, 2018

(87) PCT Pub. No.: WO2018/066137
PCT Pub. Date: Apr. 12, 2018

(65) Prior Publication Data
US 2019/0232410 A1 Aug. 1, 2019

(51) Int. Cl.
*B23K 37/04* (2006.01)
*B23K 5/00* (2006.01)
(Continued)

(52) U.S. Cl.
CPC ............... *B23K 5/003* (2013.01); *B23K 5/02* (2013.01); *B23K 5/22* (2013.01); *B23K 9/02* (2013.01);
(Continued)

(58) Field of Classification Search
CPC . B23K 5/003; B23K 5/02; B23K 5/22; B23K 9/02; B23K 9/0956; B23K 9/1274;
(Continued)

(56) References Cited

U.S. PATENT DOCUMENTS 3,963,896 A * 6/1976 Lucas .................... B23K 9/028
219/125.11
4,689,467 A * 8/1987 Inoue .................... B23K 10/00
219/121.6
(Continued)

FOREIGN PATENT DOCUMENTS

EP      0758940         10/1999
GB      874258 A  *    8/1961  ........... B23K 9/0288
(Continued)

OTHER PUBLICATIONS

"International Search Report (Form PCT/ISA/210)" of PCT/JP2016/080005, dated Nov. 8, 2016, with English translation thereof, pp. 1-3.
(Continued)

*Primary Examiner* — Kiley S Stoner
(74) *Attorney, Agent, or Firm* — JCIPRNET

(57) ABSTRACT

A welding device according to some embodiments includes a rotary table fixing two irregular shaped plates which are overlapped, a torch unit including a welding torch positioned to face outer peripheral edges of the two irregular shaped plates fixed to the rotary table, a torch actuator configured to move the welding torch toward and away from the outer peripheral edges, an after-shielding part mounted to the welding torch on downstream side in a rotational direction of the rotary table and having nozzles arranged along the rotational direction, configured to jet shielding gas to the outer peripheral edges, and including a first nozzle positioned upstream and a second nozzle positioned downstream of the first nozzle in the rotational direction, and a (Continued)

controller configured to control an orientation of the nozzle in a direction of decreasing a shielding-gas-jetting distance between the second nozzle and the outer peripheral edges welded by the welding torch.

8 Claims, 9 Drawing Sheets

(51) Int. Cl.
| | |
|---|---|
| *B23K 5/02* | (2006.01) |
| *B23K 5/22* | (2006.01) |
| *B23K 9/02* | (2006.01) |
| *B23K 9/095* | (2006.01) |
| *B23K 9/127* | (2006.01) |
| *B23K 9/16* | (2006.01) |
| *B23K 9/29* | (2006.01) |
| *B23K 9/32* | (2006.01) |
| *B23K 37/02* | (2006.01) |
| *B23K 101/14* | (2006.01) |

(52) U.S. Cl.
CPC .......... *B23K 9/0956* (2013.01); *B23K 9/1274* (2013.01); *B23K 9/164* (2013.01); *B23K 9/291* (2013.01); *B23K 9/325* (2013.01); *B23K 37/02* (2013.01); *B23K 37/04* (2013.01); *B23K 2101/14* (2018.08)

(58) Field of Classification Search
CPC ........ B23K 9/164; B23K 9/291; B23K 9/325; B23K 2101/14; B23K 9/126; B23K 9/127; B23K 9/28
USPC .......................... 228/218–220, 42, 44.3–49.6
See application file for complete search history.

(56) References Cited

U.S. PATENT DOCUMENTS

| | | | |
|---|---|---|---|
| 5,084,603 A | 1/1992 | Bernuchon et al. | |
| 6,403,921 B1* | 6/2002 | Maeda ..................... | H02K 3/12 219/125.11 |
| 10,702,949 B2* | 7/2020 | Zhu ......................... | B23K 26/14 |
| 2001/0001680 A1* | 5/2001 | Farmer ................ | B23K 26/389 427/348 |
| 2004/0140300 A1* | 7/2004 | Yoshikawa .......... | B23K 26/147 219/121.84 |
| 2006/0278619 A1* | 12/2006 | Acker .................... | B23K 26/40 219/121.67 |
| 2007/0023479 A1* | 2/2007 | Koppert ............... | B23K 9/0286 228/101 |
| 2013/0068745 A1 | 3/2013 | Agosti et al. | |
| 2016/0067827 A1* | 3/2016 | Zediker ................ | B23K 26/144 219/76.12 |
| 2016/0332258 A1* | 11/2016 | Sakaguchi .......... | F16L 13/0245 |
| 2019/0111514 A1* | 4/2019 | Matsushita ............. | C22C 38/44 |

FOREIGN PATENT DOCUMENTS

| | | |
|---|---|---|
| GB | 876068 | 8/1961 |
| JP | S5075149 | 6/1975 |
| JP | S5193751 | 8/1976 |
| JP | H08238587 | 9/1996 |
| JP | 2002-301571 | 10/2002 |
| JP | 3802055 | 7/2006 |
| JP | 2007-144427 | 6/2007 |
| JP | 2010-284696 | 12/2010 |
| JP | 5690532 | 3/2015 |
| WO | 2014091400 | 6/2014 |

OTHER PUBLICATIONS

"International Preliminary Report on Patentability; this report contains the following items :Form PCT/IB/338, PCT/IB/373, PCT/IB/326, PCT/ISA237(cover sheet), PCT/ISA237(Box No. I),PCT/ISA237(Box No. V)", dated Nov. 8, 2016, which is English translation of "Written Opinion of the International Searching Authority", p. 1-p. 10.

"Office Action of China Counterpart Application," dated Mar. 4, 2020, with English translation thereof, p. 1-p. 14.

"Search Report of Europe Counterpart Application", dated May 13, 2019, p. 1-p. 7.

* cited by examiner

WELDING DEVICE

CROSS-REFERENCE TO RELATED APPLICATION

This application is a 371 of international application of PCT application serial no. PCT/JP2016/080005, filed on Oct. 7, 2016. The entirety of each of the abovementioned patent applications is hereby incorporated by reference herein and made a part of this specification.

TECHNICAL FIELD

The present disclosure relates to a welding device for welding outer peripheral edges of irregular shaped plates having a length from the center to the outer peripheral edge varying in the circumferential direction.

BACKGROUND ART

As described in Patent Document 1, in a heat exchanging part of a shell-and-plate type heat exchanger, numerous plates with the same shape are overlapped, and adjacent plates are welded along their outer peripheral edges so that a refrigerant flow path is formed between the plates.

The heat exchanging part of the shell-and-plate type heat exchanger disclosed in Patent Document 1 is constituted by numerous overlapped perfect-circular plates.

Immediately after welding, an after-shielding gas is jetted to a weld to shield the weld from atmosphere and prevent the weld from oxidizing while cooling the weld. Thereby, welding defects such as welding scale are prevented. Patent Documents 2 and 3 disclose a welding device including an after-shielding nozzle for jetting an after-shielding gas.

CITATION LIST

Patent Literature

Patent Document 1: JP5690532B
Patent Document 2: JP2002-301571A
Patent Document 3: JP2007-144427A

SUMMARY

Problems to be Solved

In a case where perfect-circular plates are rotated and welded along their outer peripheral edges with a welding torch positioned to face the outer peripheral edges, the distance of the rotation center from the outer peripheral edges is always constant. Thus, the after-shielding nozzle can be easily placed at an appropriate distance from the welded outer peripheral edges to improve an antioxidant effect.

However, in a case where irregular shaped plates having a length from the rotation center to the outer peripheral edge varying in the circumferential direction are welded along their outer peripheral edges in the same way, the distance of the rotation center from the outer peripheral edges varies in the circumferential direction of the outer peripheral edges. Thus, the after-shielding nozzle cannot be easily always placed at an appropriate position relative to the welded outer peripheral edges.

An object of some embodiments is to improve the antioxidant effect of a weld and prevent welding defects such as welding scale when outer peripheral edges of irregular shaped plates are welded.

Solution to the Problems (1) A welding device according to some embodiments is a welding device for welding outer peripheral edges of two irregular shaped plates which are overlapped, the device comprising: a rotary table to which the two irregular shaped plates in an overlapped state are fixed; a torch unit including a welding torch positioned to face the outer peripheral edges of the two irregular shaped plates fixed to the rotary table; an after-shielding part positioned downstream of the welding torch in a rotational direction of the rotary table and disposed on the welding torch, the after-shielding part having a plurality of nozzles arranged along the rotational direction and configured to jet a shielding gas to the outer peripheral edges, the plurality of nozzles including a first nozzle positioned upstream in the rotational direction and a second nozzle positioned downstream of the first nozzle in the rotational direction; a nozzle actuator disposed on the welding torch and configured to rotationally move the second nozzle in a circumferential direction of the outer peripheral edges (the same or opposite direction to the rotational direction); and a controller configured to control an orientation of the nozzle in a direction of decreasing a distance at which the shielding gas jetted from the second nozzle reaches the outer peripheral edges welded by the welding torch.

Herein, the "irregular shaped plate" refers to a plate having a length from the rotation center, when the plate is fixed to a rotary table, to the outer peripheral edge varying in the circumferential direction. For instance, the outer peripheral edge of this plate is not composed by an arc having the same curvature in the circumferential direction like a perfect circle but has different curvature in the circumferential direction. For instance, an ellipsoidal plate is included, but it is not limited to a shape in which the outer peripheral edge is composed of only arc, such as an ellipse.

The outer peripheral edges are welded by the welding torch, and the weld immediately after welding is covered with the shielding gas jetted from the plurality of nozzles, whereby the weld is prevented from oxidizing.

In the above configuration (1), the nozzles are desirably brought into close proximity to the welded outer peripheral edges of the irregular shaped plates in order to improve the antioxidant effect due to the shielding gas.

In some cases, the second nozzle positioned downstream in the rotational direction of the rotary table can be apart from the outer peripheral edges depending on the curvature of the outer peripheral edges. In view of this, the nozzle actuator is controlled by the controller so that the second nozzle is rotationally moved in the circumferential direction of the outer peripheral edge to decrease the distance at which the shielding gas jetted from the second nozzle reaches the outer peripheral edges welded by the welding torch. Thereby, it is possible to improve the antioxidant effect due to the shielding gas jetted form the second nozzle.

In the first nozzle positioned near the welding torch and upstream in the rotational direction, the antioxidant effect can be achieved even without controlling the orientation of the first nozzle.

The after-shielding part is disposed on the welding torch and thus moves with the welding torch. Thus, it does not require a specific actuator, saving the cost. Moreover, when the plurality of nozzles is provided to the welding torch, relative positions of the plurality of nozzles relative to the welding torch can be accurately determined in advance so as to optimize a timing of jetting the shielding gas to welded outer peripheral edges.

(2) In an embodiment, in the above configuration (1), the controller has a nozzle posture map in which the orientation of the second nozzle is described by a coordinate, at least for each of regions having different curvatures of the outer peripheral edges, in a two-dimensional coordinate system whose origin is a rotation center of the two irregular shaped plates, and the controller is configured to control the orientation of the second nozzle based on the nozzle posture map.

In the above configuration (2), the orientation of the second nozzle is previously set so as to improve the antioxidant effect based on the nozzle posture map. Thus, it is possible to improve the antioxidant effect of the welded outer peripheral edges.

(3) In an embodiment, in the above configuration (2), in the nozzle posture map, the orientation of the second nozzle is represented by an angle between an axis of the second nozzle and a tangential line of the outer peripheral edges facing the second nozzle.

In the above configuration (3), the orientation of the second nozzle is represented by the angle between the axis of the second nozzle and the tangential line of the outer peripheral edges in the nozzle posture map. Thus, it is possible to easily set the orientation of the second nozzle in the two-dimensional coordinate system.

(4) In an embodiment, in any one of the above configurations (1) to (3), the nozzle actuator includes an air cylinder having a piston rod rotatably attached to the second nozzle.

In the above configuration (4), the nozzle actuator is simplified and lightened since it is composed of the air cylinder. Thus, even when the nozzle actuator is disposed on the welding torch, the torch unit does not considerably increase the weight, and the operation of the torch unit is not disturbed.

(5) In an embodiment, in any one of the above configurations (1) to (4), the welding device further comprises a linkage mechanism configured to bring the second nozzle into close proximity to the outer peripheral edges with change in the orientation of the second nozzle by the nozzle actuator.

In the above configuration (5), since the second nozzle is brought into close proximity to the outer peripheral edges with change in the orientation by the nozzle actuator, the shielding effect of the shielding gas on the weld is further improved. Thus, it is possible to further improve the antioxidant effect of the weld.

(6) In an embodiment, in the above configuration (5), the first nozzle is attached to the linkage mechanism, and the first nozzle is rotationally moved by the linkage mechanism in an identical direction to the second nozzle with change in the orientation of the second nozzle.

In the above configuration (6), the first nozzle is moved in conjunction with change in the orientation of second nozzle. Thereby, it is possible to further improve the antioxidant effect of the weld.

(7) In an embodiment, in any one of the above configurations (1) to (6), the plurality of nozzles is provided with a pair of heat-resistant covers, the heat resistant covers being oriented so that the shielding gas jetted from the nozzles crosses front and rear surfaces of the irregular shaped plates and covering a shielding-gas-jetting space from opposite sides.

In the above configuration (7), the heat-resistant covers inhibit the shielding gas jetted from the nozzles diffusing from the vicinity of the nozzles and the welded outer peripheral edges. Thus, it is possible to improve the antioxidant effect of the welded outer peripheral edges.

(8) In an embodiment, in the above configuration (7), a nozzle port of the nozzle has a rectangular cross-section, and the heat-resistant covers are attached to an outer surface of a partition wall defining the rectangular cross-section and positioned in a direction along the outer peripheral edges.

In the above configuration (8), since the heat-resistant covers are attached to the flat outer surface of the partition wall, the heat-resistant covers can be easily attached. Further, since the vicinity of the nozzles and the welded outer peripheral edges are covered with the heat-resistant covers so as to be sandwiched from opposite sides in a direction intersecting the front and rear surfaces of the outer peripheral edges, it is possible to improve the diffusion prevention effect of the shielding gas. Consequently, it is possible to improve the antioxidant effect of the welded outer peripheral edges.

Advantageous Effects

According to some embodiments, when outer peripheral edges of irregular shaped plates are welded, the antioxidant effect due to a shielding gas jetted through not only a first nozzle disposed near a welding torch, but also a second nozzle disposed downstream in a rotational direction is improved. Thus, it is possible to reduce welding defects such as welding scale.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
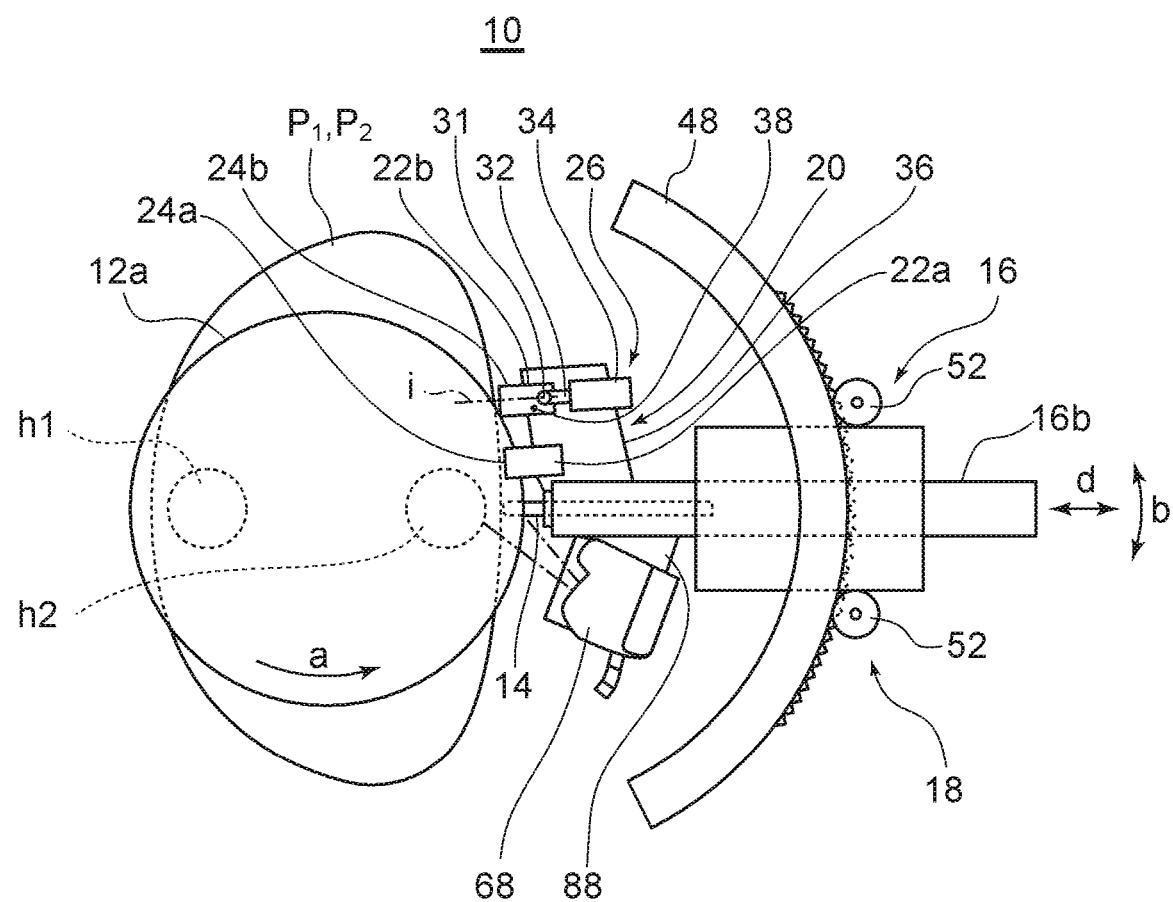
FIG. 1 is a plan view of a welding device according to an embodiment.
Figure 2:
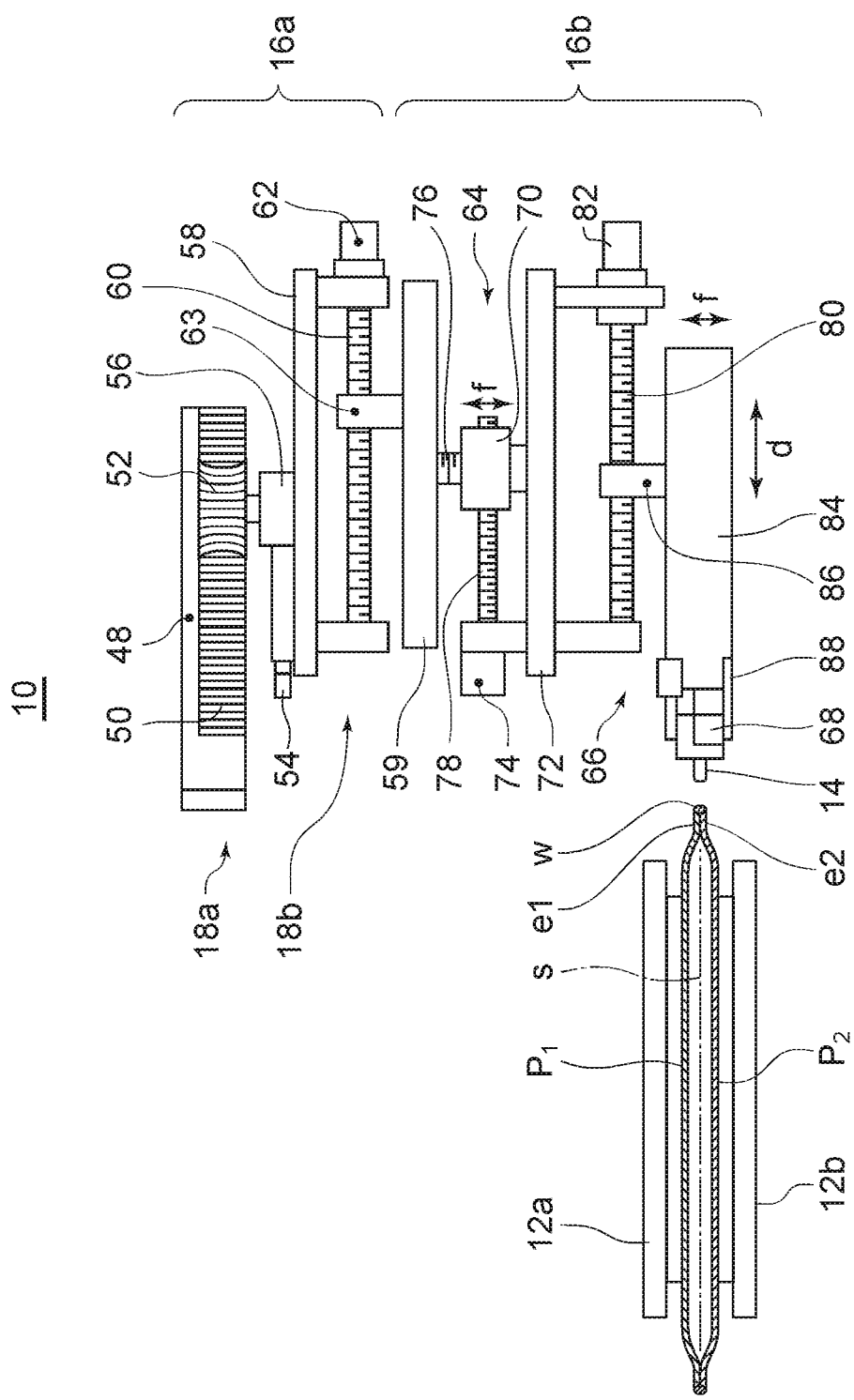
FIG. 2 is a front view of a welding device according to an embodiment.

A welding device 10 according to an embodiment is to weld outer peripheral edges e1 and e2 of overlapped two irregular shaped plates $P_1$ and $P_2$ to be welded, as shown in FIGS. 1 and 2. The welding device 10 includes rotary tables 12a and 12b. The overlapped irregular shaped plates $P_1$ and $P_2$ are disposed between the rotary tables 12a and 12b and held between the rotary tables. The irregular shaped plates $P_1$ and $P_2$ have the same size and the same shape so that their outer peripheral edges e1 and e2 are substantially identical to each other when they are stacked.

A welding torch 14 is located at an outside position to face the outer peripheral edges e1 and e2 of the two irregular shaped plates $P_1$ and $P_2$ fixed between the rotary tables 12a and 12b. The welding torch 14 is attached to a torch unit 16.

The welding device further includes an after-shielding part 20 disposed downstream of the welding torch 14 in a rotational direction "a" of the rotary tables 12a and 12b. The after-shielding part 20 is disposed on the welding torch 14 and has a plurality of nozzles 22a and 22b arranged along the rotational direction "a" of the rotary tables 12a and 12b. The nozzles 22a and 22b have nozzle ports 24a and 24b through which a shielding gas is jetted. The nozzle ports 24a and 24b are directed to the outer peripheral edges e1 and e2. Among the plurality of nozzles 22a and 22b, a first nozzle 22a is positioned upstream in the rotational direction, and a second nozzle 22b is positioned downstream in the rotational direction.

Figure 5:
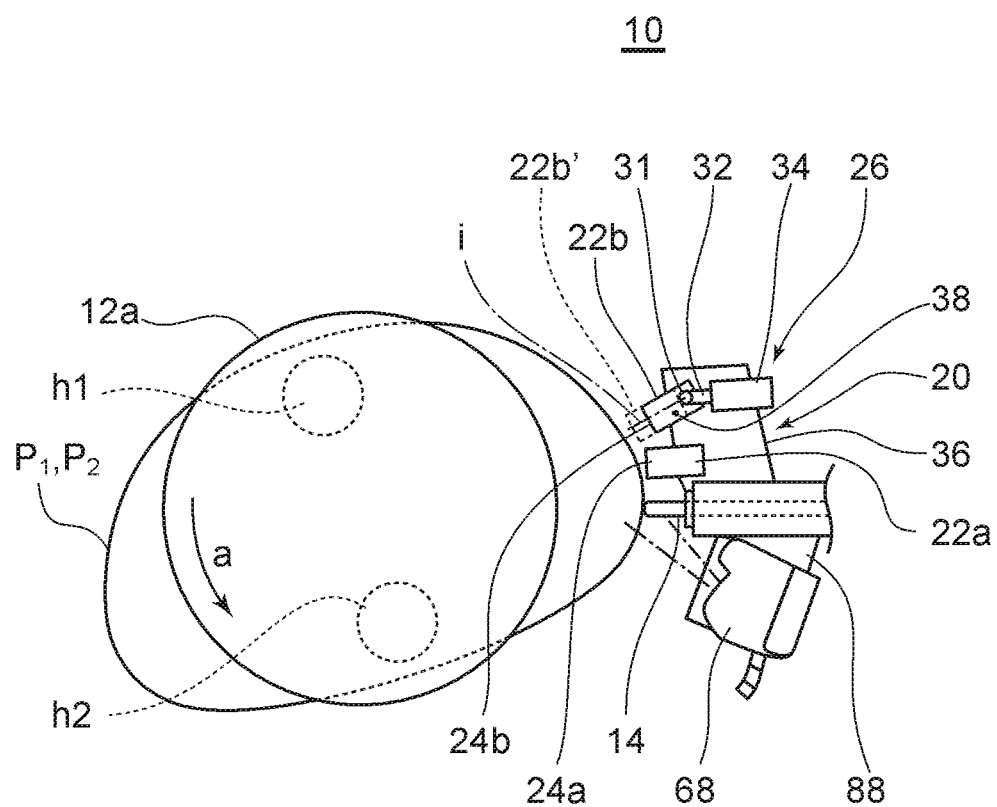
FIG. 5 is a plan view of a welding device according to an embodiment.

As shown in FIG. 1, the welding device 10 further includes a nozzle actuator 26 configured to rotationally move the nozzle port 24b of the second nozzle 22b in the circumferential direction of the outer peripheral edges (the same or opposite direction to the rotational direction "a"). The orientation of the second nozzle 22b is controlled by a first controller 28 shown in FIG. 3 in a direction of decreasing a distance at which the shielding gas jetted from the nozzle port 24b reaches a weld w of the outer peripheral edges e1 and e2 (typically, toward first nozzle 22a). FIG. 5 shows a state where the orientation of the second nozzle 22b is thus controlled.

In the above configuration, the rotary tables 12a and 12b are rotated, for instance, at a constant circumferential speed. The outer peripheral edges of the irregular shaped plates $P_1$ and $P_2$ are welded by the welding torch 14, and the weld w of the outer peripheral edges e1 and e2 are prevented from oxidizing by the after-shielding gas jetted from the plurality of nozzles 22a and 22b. In this regard, as shown in FIG. 5, since the first controller 28 controls the orientation of the nozzle port 24b so as to decrease the shielding-gas-traveling distance to the weld w of the outer peripheral edges, the antioxidant effect due to the after-shielding gas is improved. Thereby, it is possible to prevent welding defects such as welding scale.

Thus, controlling the orientation of the second nozzle 22b, which is farther away from the welding torch 14 than the first nozzle 22a is, improves the antioxidant effect of the weld w.

Moreover, the after-shielding part 20 mounted to the welding torch 14 does not require a specific actuator, thus saving the cost. Moreover, relative positions of the plurality of nozzles 22a and 22b relative to the welding torch 14 can be accurately determined in advance so as to optimize a timing of jetting the shielding gas to the weld w.

Figure 6B:
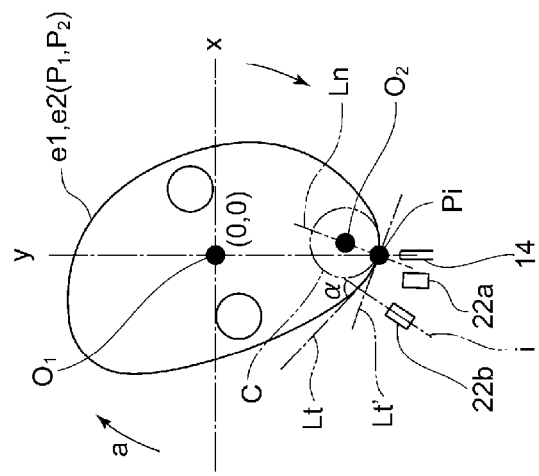
FIG. 6A and FIG. 6B are each an explanatory diagram showing the operation of a welding device according to an embodiment.
Figure 6A:
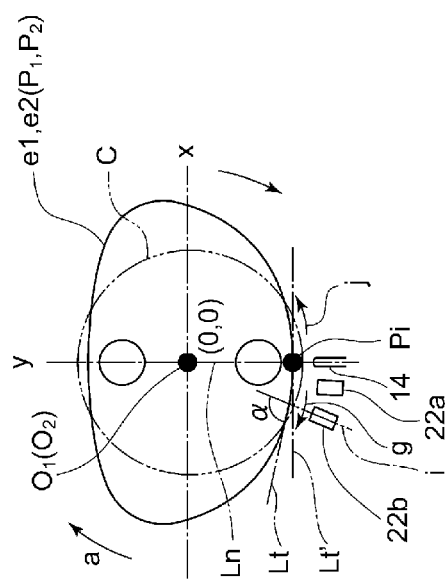

FIG. 6A shows a case where outer peripheral edges e1 and e2 having small curvature are welded; FIG. 6B shows a case where outer peripheral edges e1 and e2 having large curvature are welded.

In the case where the outer peripheral edge of the weld w has large curvature, as shown in FIG. 6B, the second nozzle 22b positioned downstream of the first nozzle 22a in the rotational direction can be apart from the outer peripheral edge. In view of this, the nozzle actuator 26 is controlled by the first controller 28 so that the second nozzle 22b is rotationally moved in the circumferential direction of the outer peripheral edge (typically, toward first nozzle 22a) to decrease the distance at which the shielding gas jetted from the second nozzle reaches the outer peripheral edges welded by the welding torch 14. Thereby, it is possible to improve the antioxidant effect due to the shielding gas jetted form the second nozzle.

The first nozzle 22a disposed near the welding torch and upstream in the rotational direction does not necessarily require controlling the orientation, for the antioxidant effect can be achieved even without controlling the orientation of the first nozzle 22a.

Figure 3:
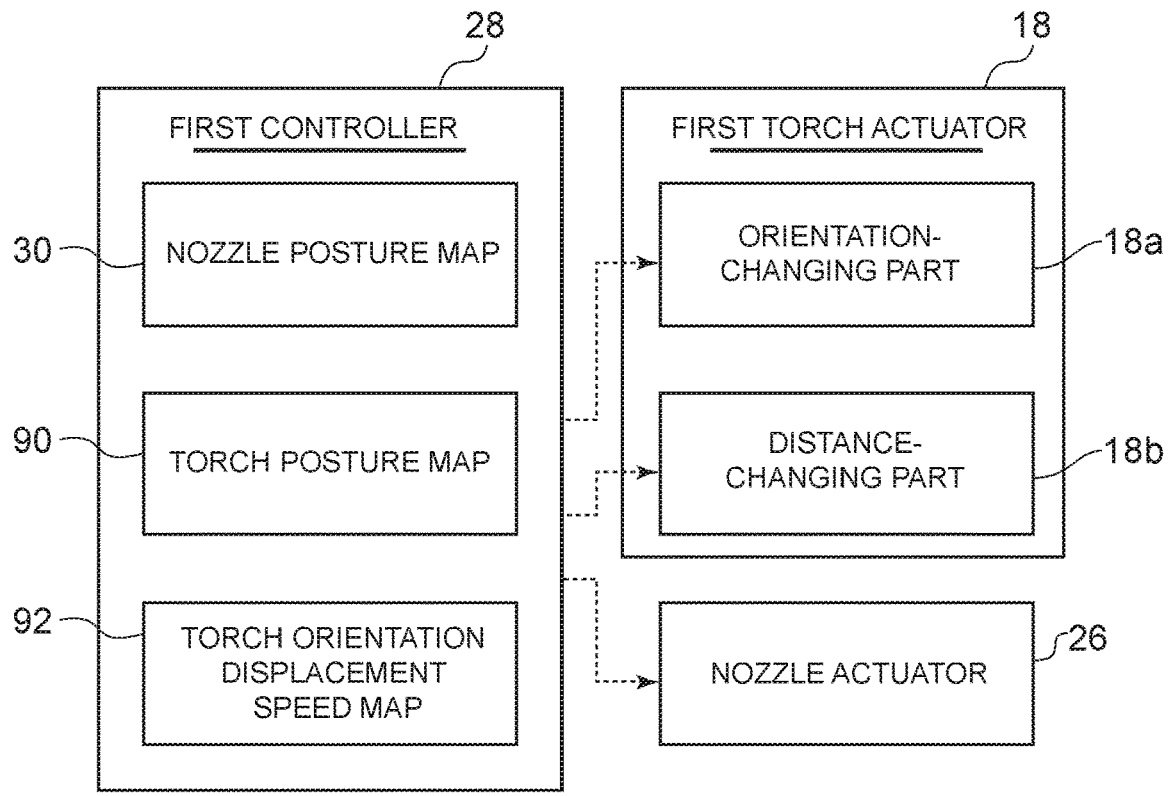
FIG. 3 is a block diagram of a control system of a welding device according to an embodiment.

In an embodiment, as shown in FIGS. 2 and 3, the welding device includes a first torch actuator 18 configured to move the welding torch 14 toward and away from the outer peripheral edges e1 and e2.

In an embodiment, the irregular shaped plates $P_1$ and $P_2$ form a heat exchanging part of a shell-and-plate type heat exchanger, like the perfect-circular plates disclosed in Patent Document 1. As shown in FIG. 1, the irregular shaped plates $P_1$ and $P_2$ are provided with inner circle of holes h1 and h2 through which a refrigerant passes. The inner edges of these circular holes h1 and h2 are aligned by three fixing claws (not shown), so that the two irregular shaped plates $P_1$ and $P_2$ to be welded are overlapped.

In an embodiment, as shown in FIG. 3 and FIG. 6A and FIG. 6B, the first controller 28 has a nozzle posture map 30 in which the orientation of the second nozzle 22b is described by a coordinate, at least for each region having different curvature of the outer peripheral edges, in a two-dimensional coordinate system with x-axis and y-axis, whose origin (0, 0) is a rotation center $O_1$ of the rotary tables 12a and 12b (i.e., the rotation center of the two irregular shaped plates $P_1$ and $P_2$). The first controller 28 controls the orientation of the second nozzle 22b, based on the nozzle posture map 30.

Thus, since the orientation of the second nozzle 22b is previously set so as to improve the antioxidant effect based on the nozzle posture map 30, it is possible to improve the antioxidant effect of the weld w.

Figure 7:
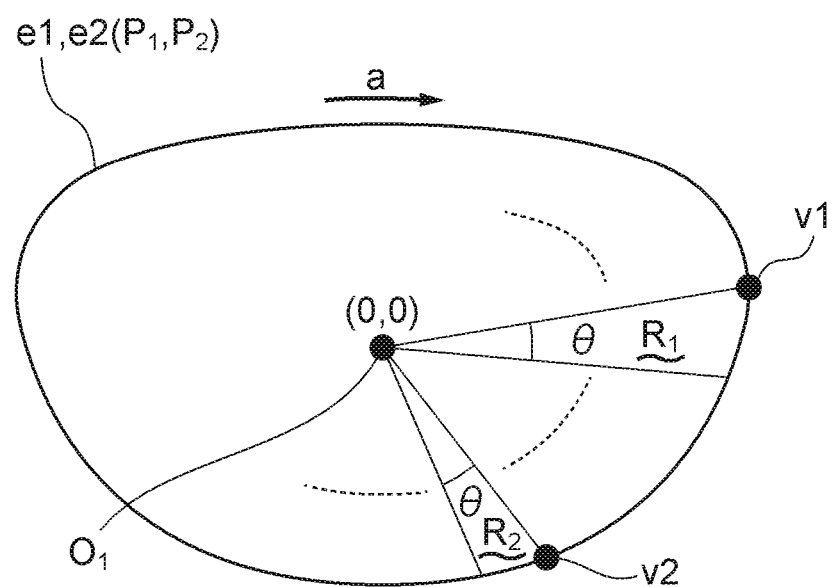
FIG. 7 is an explanatory diagram showing an example of a welding control map of irregular shaped plates.

In an embodiment, as shown in FIG. 7, the rotation center $O_1$ is divided into regions R ($R_1$, $R_2$, . . . ) with the same central angle θ, and the orientation of the second nozzle 22b is described by a coordinate for each of the regions R ($R_1$, $R_2$, . . . ). The first controller 28 controls the orientation of the second nozzle 22b, based on this coordinate description. When the central angle θ is small, the orientation of the second nozzle 22b can be finely set in the circumferential direction of the outer peripheral edges.

In an embodiment, in the two-dimensional coordinate system of the nozzle posture map 30, as shown in FIG. 6A and FIG. 6B, the orientation of the second nozzle 22b is represented by an angle α between an axis i of the second nozzle 22b and a tangential line Lt of the outer peripheral edges e1 and e2 facing the second nozzle 22b.

Thus, when the orientation of the second nozzle 22b is represented by the angle α between the axis i of the second nozzle 22b and the tangential line Lt in the two-dimensional coordinate system, the orientation of the second nozzle 22b can be easily set by the first controller 28.

In an embodiment, as shown in FIG. 1, the nozzle actuator 26 includes an air cylinder 34 having a piston rod 32 rotatably attached to the second nozzle 22b via a shaft 31. The first controller 28 controls driving of the air cylinder 34.

In the above configuration, the nozzle actuator 26 is simplified and lightened since it is composed of the air cylinder 34. Thus, even when the nozzle actuator 26 is disposed on the welding torch 14, the torch unit 16 does not considerably increase the weight, and the operation of the torch unit 16 is not disturbed.

In an embodiment, as shown in FIG. 1, a fixation plate 36 is attached to the welding torch 14, and the first nozzle 22a and the second nozzle 22b are attached to the fixation plate 36. The second nozzle 22b is rotatably attached to the fixation plate 36 via a shaft 38.

Figure 8A:
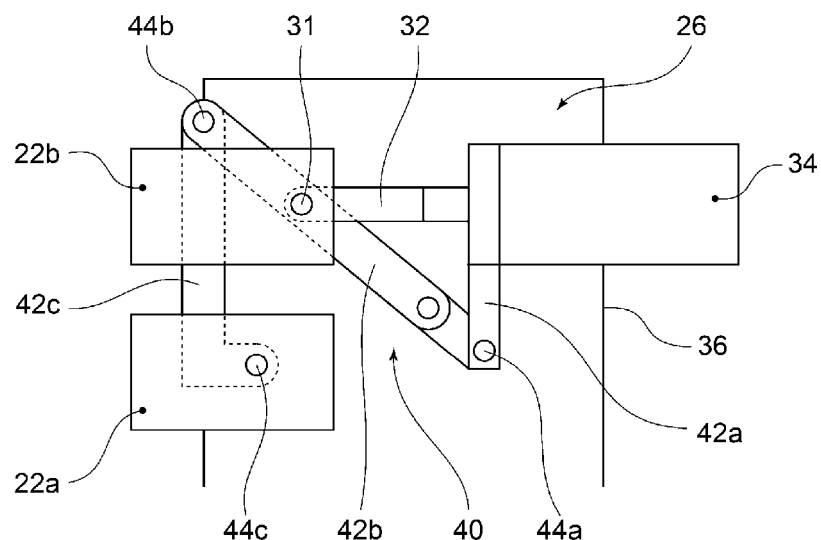
FIG. 8A and FIG. 8B are each a plan view of a linkage mechanism according to an embodiment.
Figure 8B:
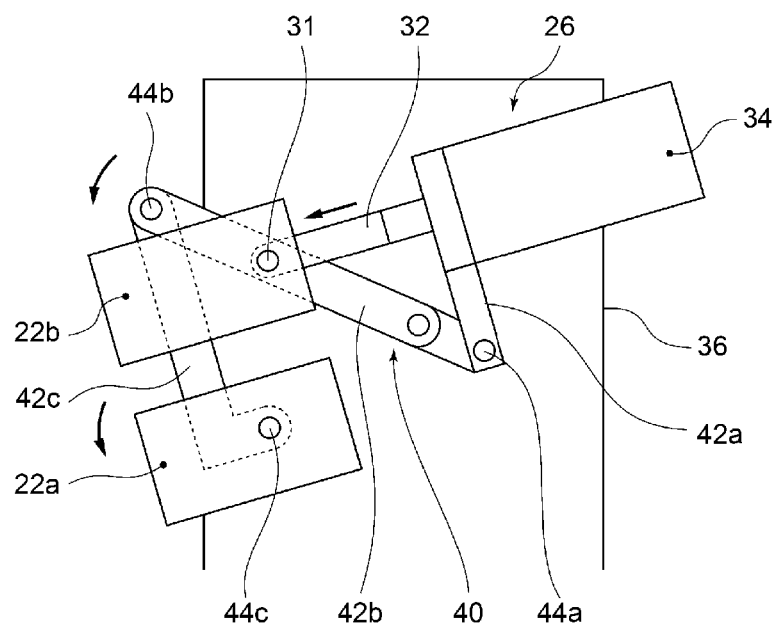

In an embodiment, as shown in FIG. 8A and FIG. 8B, the welding device includes a linkage mechanism 40 configured to bring the second nozzle 22b into close proximity to the outer peripheral edges e1 and e2 with change in the orientation of the second nozzle 22b by the nozzle actuator 26.

In the above configuration, since the second nozzle 22b is brought into close proximity to the outer peripheral edges e1 and e2 with change in the orientation by the nozzle actuator 26, the shielding effect of the shielding gas on the weld w is further improved. Thereby, it is possible to further improve the antioxidant effect of the weld w due to the shielding gas.

In FIG. 5, when the weld w is a portion where the outer peripheral edges e1 and e2 have large curvature, the axis i of the second nozzle 22b is inclined in a direction opposite to the rotational direction "a" to decrease the shielding-gas-jetting distance to the weld w.

The reference sign 22b shows the position of the second nozzle 22b in an embodiment when the second nozzle 22b is rotationally moved toward the first nozzle 22a by the nozzle actuator 26. The reference sign 22b' shows the position of the second nozzle when the welding device further includes the linkage mechanism 40 shown in FIG. 8A and FIG. 8B, and the second nozzle 22b is brought into close proximity to the weld w by the linkage mechanism 40 while the second nozzle 22b is rotationally moved.

In an embodiment, as shown in FIG. 8A and FIG. 8B, the first nozzle 22a is attached to the linkage mechanism 40 and is configured to rotationally move in the same direction as the second nozzle 22b (i.e., toward the welding torch 14) by the linkage mechanism 40 with the rotational movement of the second nozzle 22b.

In the above configuration, since the first nozzle 22a is rotationally moved toward the welding torch 14 with the rotational movement of the second nozzle 22b, the shielding effect of the shielding gas on the weld w is further improved. Thereby, it is possible to further improve the antioxidant effect of the weld w.

In an embodiment, as shown in FIG. 8A and FIG. 8B, the linkage mechanism 40 includes links 42a, 42b, and 42c. One end of the link 42a is connected to the air cylinder 34, and the other end is rotatably connected to one end of the link 42b with a shaft 44a. The link 42b is rotatably supported by a shaft 31 at an axial middle portion. The other end of the link 42b is rotatably connected to one end of the link 42c with a shaft 44b. The other end of the link 42c is rotatably connected to the fixation plate 36 with a shaft 44c.

When the piston rod 32 expands, the second nozzle 22b is inclined toward the first nozzle 22a and approximates to the outer peripheral edges e1 and e2. Simultaneously, the first nozzle 22a is also inclined toward the welding torch 14 (arrow direction).

Thereby, it is possible to further improve the shielding effect due to the shielding gas jetted from the first nozzle 22a and the second nozzle 22b to the weld w immediately after welding of the weld w, and it is possible to further improve the antioxidant effect of the weld w.

Figure 9:
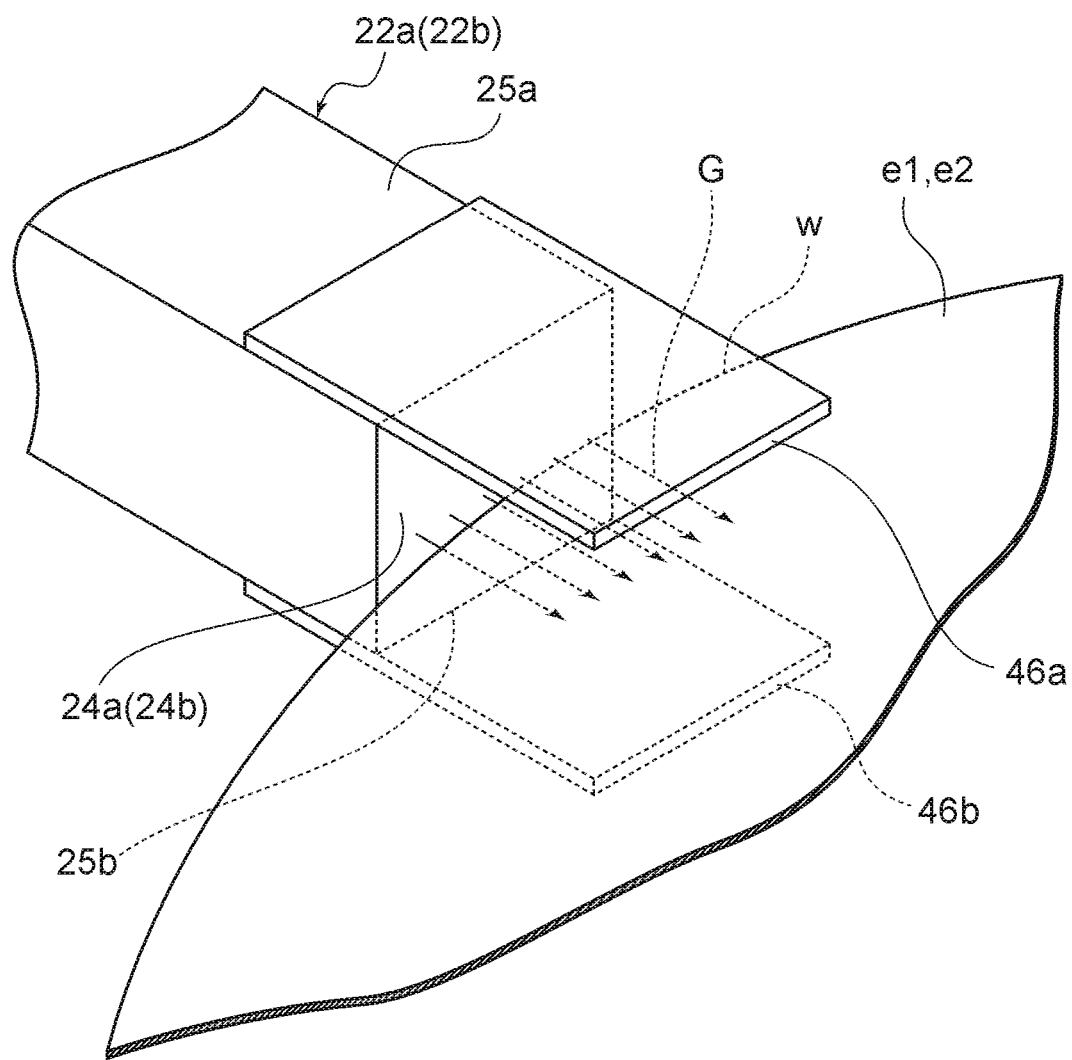
FIG. 9 is a perspective view of a nozzle port according to an embodiment.

In an embodiment, as shown in FIG. 9, the nozzles 22a and 22b are each provided with a pair of heat-resistant covers 46a and 46b. The pair of heat-resistant covers 46a and 46b is oriented so that the shielding gas G jetted from the corresponding nozzle crosses the front and rear surfaces of the irregular shaped plates $P_1$ and $P_2$. The heat-resistant covers 46a and 46b cover a shielding-gas-jetting space from opposite sides.

In the above configuration, the heat-resistant covers 46a and 46b inhibit the shielding gas jetted from the first nozzle 22a and the second nozzle 22b diffusing from the vicinity of the weld. Thus, it is possible to improve the antioxidant effect of the weld w.

In an embodiment, as shown in FIG. 9, the nozzle port 24a and 24b of the first nozzle 22a or the second nozzle 22b has a rectangular cross-section. The heat-resistant covers 46a and 46b are attached to the outer surfaces of partition walls 25a and 25b defining the rectangular cross-section of the nozzle port 24a and 24b and disposed in a direction along the outer peripheral edges e1 and e2.

In the above configuration, since the heat-resistant covers 46a and 46b are attached to the flat outer surfaces of the partition walls, the heat-resistant covers 46a and 46b can be easily attached. Further, when the shielding gas G is jetted to the weld w, the weld w is covered with the heat-resistant covers 46a and 46b so as to be sandwiched from opposite sides in a direction intersecting the front and rear surfaces of the outer peripheral edges e1 and e2. Thus, it is possible to effectively inhibit the shielding gas defusing from the weld w, and it is possible to improve the antioxidant effect of the weld w.

The heat-resistant covers 46a and 46b may be for instance composed of a heat-resistant glass fabric. The cover composed of a heat-resistant glass fabric is light and facilitates controlling the orientation of the nozzle.

In an embodiment, in the embodiment including the linkage mechanism 40 configured to rotationally move the first nozzle 22a in the same direction as the second nozzle 22b with change in the orientation of the second nozzle 22b, a nozzle posture map 30 in which the orientation of the first nozzle 22a and the second nozzle 22b is described by a coordinate is provided as shown in FIG. 3. The first controller 28 controls the orientation of the first nozzle 22a and the second nozzle 22b, based on the nozzle posture map 30.

Thus, since the first controller 28 controls the orientation of the first nozzle 22a and the second nozzle 22b based on the nozzle posture map 30, it is possible to keep the shielding-gas-jetting distance from each of the first nozzle 22a and the second nozzle 22b to the weld w small along the circumferential direction of the outer peripheral edges e1 and e2, in accordance with the shape of the outer peripheral edges of the irregular shaped plates $P_1$ and $P_2$. Thereby, it is possible to improve the antioxidant effect of the weld w over the entire region of the outer peripheral edges e1 and e2 in the circumferential direction.

In an embodiment, the angle of the first nozzle 22a is automatically determined based on the angle of the second nozzle 22b and the configuration of the linkage mechanism 40.

Thereby, it becomes unnecessary to provide an actuator and a controller of the first nozzle 22a, and it is possible to reduce the cost.

In an embodiment, the rotary tables 12a and 12b only need to be rotated at a constant speed. Thereby, it is possible to simplify an actuator of the rotary tables and reduce the cost. Further, since the welding torch 14 does not need to move in the circumferential direction of the outer peripheral edges e1 and e2 and is basically placed at a fixed position, it is unnecessary to provide an actuator for moving the welding torch 14 in the circumferential direction of the outer peripheral edges, and it is possible to reduce the cost.

In an embodiment, as shown in FIGS. 1 and 2, the torch unit 16 to which the welding torch 14 is attached is mounted to a rail 48 in a slidable manner in a longitudinal direction (a direction shown by the arrow b in FIG. 1). The torch unit 16 is composed of a first block 16a provided with the first torch actuator 18 and a second block 16b provided with the welding torch 14.

In an embodiment, as shown in FIGS. 2 and 3, the first torch actuator 18 includes an orientation-changing part 18a configured to change the orientation of the welding torch 14 relative to a tangential line of the outer peripheral edges e1 and e2 and a distance-changing part 18b configured to change the distance of the welding torch 14 from the outer peripheral edges e1 and e2.

In an embodiment, the distance-changing part 18b is capable of changing the distance of the tip of the welding torch 14 from the outer peripheral edges e1 and e2.

In an embodiment, as shown in FIG. 1, the orientation-changing part 18a includes an arc-shaped rail 48. The rail 48 is provided to face the outer peripheral edges e1 and e2 and extends along the circumferential direction of the outer peripheral edges. In an embodiment, the distance-changing part 18b enables the tip of the welding torch 14 to linearly move in a direction (a direction shown by the arrow d in FIG. 1) toward and away from the outer peripheral edges e1 and e2. Thus, the tip of the welding torch 14 can always be positioned on the outer peripheral edges e1 and e2. By setting the arc center of the rail 48 at one point on the movement line of the tip of the welding torch 14 and on the outer peripheral edges, the orientation of the welding torch 14 relative to the outer peripheral edges e1 and e2 can be changed while the tip of the welding torch 14 is aligned with this point.

In actual welding, the tip of the welding torch 14 is disposed at a position shifted outside by a minute distance from the outer peripheral edges e1 and e2.

In an embodiment, as shown in FIG. 2, the orientation-changing part 18a is composed of a rack 50 disposed on the surface of the rail 48, a pinion 52 engaged with the rack 50, and an actuator 54 for driving the pinion 52. When the pinion 52 is driven by the actuator 54, the torch unit 16 is moved along a longitudinal direction of the rail 48. The pinion 52 is rotatably supported by a base 56, and the actuator 54 and the base 56 are fixed to a support 58.

In an embodiment, as shown in FIG. 2, the distance-changing part 18b is composed of a ball screw 60 rotatably supported by the support 58, an actuator 62 disposed on the support 58, and a slide block 63 integral with the support 58 and screwed with the ball screw 60. The support 59 fixed to the slide block 63 forms a part of the second block 16b.

When the ball screw 60 is rotated by the actuator 62, the distance of the tip of the welding torch 14 from the outer peripheral edges e1 and e2 can be changed.

Figure 4:
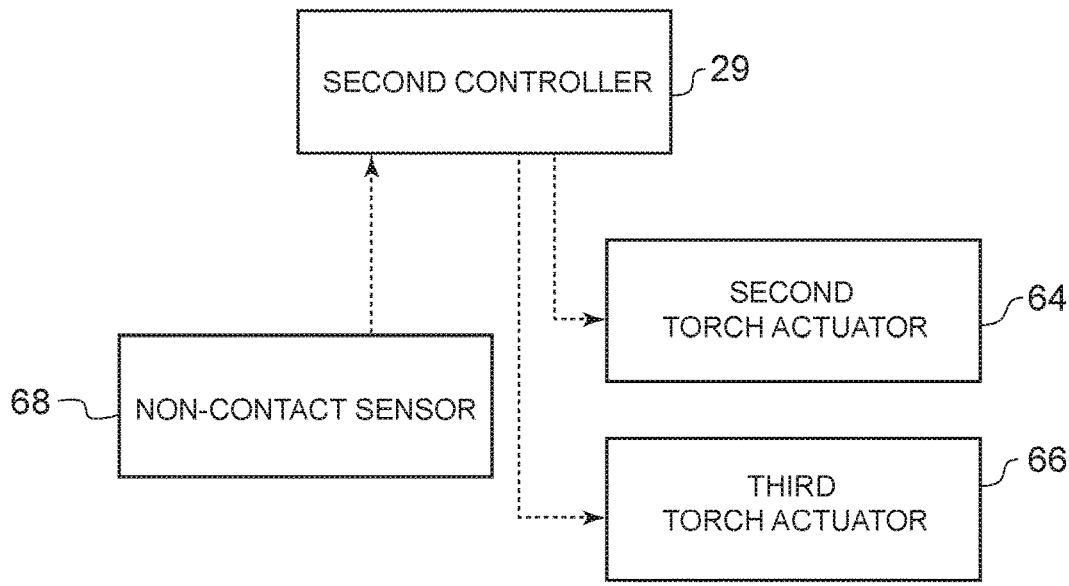
FIG. 4 is a block diagram of a control system of a welding device according to an embodiment.

In an embodiment, as shown in FIGS. 2 and 4, the second block 16b includes a second torch actuator 64 configured to move the welding torch 14 in a direction (e.g., a direction shown by the arrow f in FIG. 2) intersecting the front and back surfaces of the two irregular shaped plates $P_1$ and $P_2$, and a third torch actuator 66 configured to change the distance of the welding torch 14 from the outer peripheral edges e1 and e2. Further, as shown in FIG. 1, there is provided a non-contact sensor 68 for detecting an over-lapped position in the direction intersecting the front and back surfaces of the two irregular shaped plates $P_1$ and $P_2$ as well as the distance of the welding torch 14 from the outer peripheral edges e1 and e2.

As shown in FIG. 4, a detection result of the non-contact sensor 68 are input into a second controller 29. The second controller 29 controls the second torch actuator 64 so that the position of the welding torch 14 is matched with the over-lapped position at which the irregular shaped plates $P_1$ and $P_2$ are stacked in the direction intersecting the front and back surfaces of the two irregular shaped plates $P_1$ and $P_2$. Further, the second controller 29 controls the third torch actuator 66 so that the distance of the welding torch 14 from the outer peripheral edges e1 and e2 has a setting value.

In the above configuration, the orientation-changing part 18a and the distance-changing part 18b keep the orientation and the distance of the welding torch 14 relative to the outer peripheral edges e1 and e2 at setting values along the circumferential direction of the outer peripheral edges. Furthermore, the feedback control by detection with the non-contact sensor 68 enables the welding torch 14 to always be positioned at the overlapped position of the outer peripheral edges e1 and e2, thus ensuring heat input for the weld w. Further, since the distance of the welding torch 14 from the outer peripheral edges e1 and e1 is always kept at a setting value by the above feedback control, the penetration depth of the weld w can be made uniform along the circumferential direction of the outer peripheral edges, and thus it is possible to reduce welding defects due to the lack of penetration.

In an embodiment, as shown in FIG. 2, the second torch actuator 64 includes an actuator 74 fixed to a support 72 together with a fixation block 70. The support 59 is supported from below by a screw shaft 76 disposed in the direction shown by the arrow f. In the fixation block 70, the screw shaft 76 and a ball screw 78 are screwed so that they cross, and the actuator 74 rotates the ball screw 78 and the screw shaft 76. The rotation of the screw shaft 76 causes parallel translational motion of the fixation block 70 and the support 72 in a direction (the direction shown by the arrow f) intersecting mating surfaces s of the irregular shaped plates $P_1$ and $P_2$.

In an embodiment, as shown in FIG. 2, the third torch actuator 66 includes an actuator 82 fixed to the support 72 and configured to rotate a ball screw 80. To the ball screw 80 is screwed a slide block 86 fixed to a torch body 84. When the ball screw 80 is rotated, the torch body 84 moves linearly toward and away from the outer peripheral edges e1 and e2.

In an embodiment, as shown in FIG. 2, the non-contact sensor 68 is fixed to the second block 16b via a fixation plate 88. Consequently, the non-contact sensor 68 moves with the welding torch 14 in the directions shown by the arrows b, d, and f and thus does not require specific movement means.

In an embodiment, each actuator 54, 62, 74, and 82 is composed of a forward and reverse rotatable servo motor and rotated in forward and reverse directions by the first controller 28 or the second controller 29.

In an embodiment, the non-contact sensor 68 is a laser displacement sensor, and the second controller 29 compares a detection value of the laser displacement sensor with a master shape stored in the second controller 29 to detect the overlapped position of the irregular shaped plates $P_1$ and $P_2$ and the distance between the outer peripheral edges e1 and e2 and the welding torch 14.

The use of the laser displacement sensor, as the non-contact sensor, with laser light which is not disturbed by disturbance such as welding light improves detection accuracy.

In particular, the use of a laser displacement sensor which emits a blue laser light with a long wavelength further improves detection accuracy.

In an embodiment, as shown in FIG. 3, the first controller 28 has a torch posture map 90 and a torch orientation displacement speed map 92.

As shown in FIG. 6A and FIG. 6B, the torch posture map 90 uses a two-dimensional coordinate system with x-axis and y-axis. At the origin (0, 0) of the two-dimensional coordinate system, the rotation center $O_1$ of the rotary tables 12a and 12b (i.e., the rotation center of the irregular shaped plates $P_1$ and $P_2$) is located.

Further, as shown in FIG. 7, the outer peripheral edges are divided by regions R ($R_1$, $R_2$, ...) distinguished by at least different curvatures of the outer peripheral edges e1 and e2, and the position and the orientation of the welding torch 14 are described by a coordinate for each of setting positions v (v1, v2, ...) of the divided regions. The orientation of the welding torch 14 is set such that it is oriented at the same angle with respect to a tangential line Lt of the outer peripheral edges at every setting position of the regions as shown in FIG. 6A and FIG. 6B.

The torch orientation displacement speed map 92 is a map where the orientation displacement speed of the welding torch 14 is set such that a heating time by the welding torch 14 is constant among the setting positions v (v1, v2, ...) of the respective regions R ($R_1$, $R_2$, ...).

The first controller 28 controls the first torch actuator 18, based on the torch posture map 90 and the torch orientation displacement speed map 92.

Since the position and the orientation of the welding torch 14 are set for at least each of the regions with different curvatures of the outer peripheral edges e1 and e2 on the basis of the torch posture map 90, and the orientation of the welding torch 14 is set so as to have the same angle with respect to the outer peripheral edges at every region, it is possible to reduce welding defects due to the lack of penetration along the circumferential direction of the outer peripheral edges.

The torch orientation displacement speed map 92 where the orientation displacement speed of the welding torch 14 is set such that the heating time by the welding torch is constant among the setting positions v (v1, v2, ...) of the respective regions R ($R_1$, $R_2$, ...) can make the penetration depth uniform along the circumferential direction of the outer peripheral edges, thus reducing welding defects due to the lack of penetration.

The orientation displacement speed of the welding torch 14 can be easily altered by changing the orientation of the welding torch 14 in the same direction or opposite direction to the rotational direction "a" of the irregular shaped plates $P_1$ and $P_2$.

In an embodiment, as shown in FIG. 6A and FIG. 6B, in the torch posture map 90, the tip of the welding torch 14 is described by a coordinate at an intersection point Pi between the y-axis of the two-dimensional coordinate system and the outer peripheral edge e1, e2, and an imaginary circle C passing through the intersection point Pi is set. The orientation of the welding torch 14 is set so as to have a constant angle with respect to a normal line Ln passing through the intersection point Pi and the center point $O_2$ of the of the imaginary circle C. FIG. 6A shows a case where the rotation center $O_1$ of the rotary tables 12a, 12b and the center point $O_2$ of the imaginary circle C are coincident; FIG. 6B shows a case where the rotation center $O_1$ of the rotary tables 12a, 12b and the center point $O_2$ of the imaginary circle C are not coincident.

Thus, when the tip of the welding torch 14 is described by a coordinate at the intersection point Pi, the first controller 28 performs control so that the tip of the welding torch 14 is always located at the intersection point Pi at any rotational position of the irregular shaped plates. Consequently, it becomes easy to set the position of the welding torch 14. Further, since the orientation of the welding torch 14 is set so as to have a constant angle with respect to the normal line Ln, the welding torch 14 can be orientated so as to have a constant angle with respect to the tangential line Lt' of the outer peripheral edges always. Thus, it is possible to make the penetration depth uniform along the circumferential direction of the outer peripheral edges and reduce welding defects due to the lack of penetration.

In actual welding, the tip of the welding torch 14 is disposed at a position shifted outside of the outer peripheral edges e1 and e2 by a minute distance from the intersection point Pi.

Figure 10A:
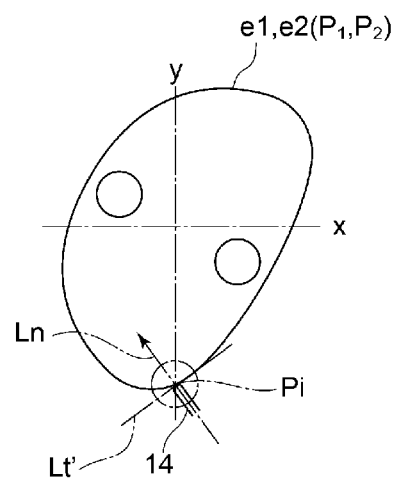
FIG. 10A is an explanatory diagram showing an exemplary welding method according to an embodiment.
Figure 10B:
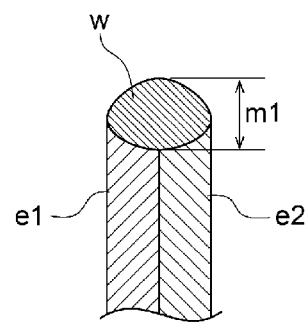
FIG. 10B is a cross-sectional view of a penetration depth according to the welding method shown in FIG. 10A.

In an embodiment, as shown in FIG. 10A and FIG. 10B, the orientation of the welding torch 14 is set so as to coincide with the normal line Ln. Thus, the welding torch 14 can be positioned perpendicular to the tangential line Lt' of the outer peripheral edges, and input heat of the outer peripheral edges can be maximized. Thus, it is possible to maximize the penetration depth of the outer peripheral edges and reduce welding defects due to the lack of penetration.

Figure 11A:
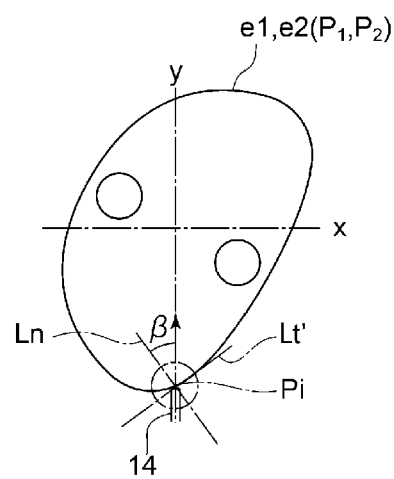
FIG. 11A is an explanatory diagram showing an exemplary welding method according to an embodiment.
Figure 11B:
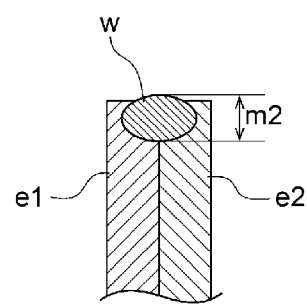
FIG. 11B is a cross-sectional view of a penetration depth according to the welding method shown in FIG. 11A.

FIG. 10A shows a case (example 1) where the orientation of the welding torch 14 is coincident with the normal line Ln; FIG. 11A shows a case (example 2) where the orientation of the welding torch 14 is not coincident with the normal line Ln and deviated from the normal line Ln at an angle β. In the example 1, since input heat of the outer peripheral edges is maximum, penetration depth m1 of the weld w is maximum, as shown in FIG. 10B. In the example 2, since input heat of the outer peripheral edges is decreased, penetration depth m2 of the weld w is decreased compared with the example 1, as shown in FIG. 11B.

A single controller may have all of the functions of the first controller 28 and the second controller 29.

The more regions R ($R_1$, $R_2$, . . . ) the outer peripheral edges are divided into, the more precisely the position and the orientation of the welding torch 14 can be controlled. For instance, if the outer peripheral edges are divided by a central angel θ of 1° to 2°, the position and the orientation of the welding torch 14 can be controlled more precisely.

The welding torch 14 may be for instance a welding torch used in gas welding in which a material to be welded is heated and welded with a gas welding machine by heat of combustion of an inflammable gas, in arc welding (including plasma welding) in which a material to be welded is melted by generating an arc between the material and the welding torch, or in any other welding method.

INDUSTRIAL APPLICABILITY

According to some embodiments, when outer peripheral edges of irregular shaped plates are welded, the antioxidant effect due to a shielding gas jetted through not only a first nozzle disposed near a welding torch, but also a second nozzle disposed downstream in the rotational direction is improved. Thus, it is possible to reduce welding defects such as welding scale.

The invention claimed is:

1. A welding device for welding outer peripheral edges of two irregular shaped plates which are overlapped, and the welding device comprising:
   a rotary table to which the two irregular shaped plates in an overlapped state are fixed;
   a torch unit, including a welding torch positioned to face the outer peripheral edges of the two irregular shaped plates fixed to the rotary table;
   an after-shielding part, positioned downstream of the welding torch in a rotational direction of the rotary table and disposed on the welding torch, the after-shielding part having a plurality of nozzles arranged along the rotational direction and configured to jet a shielding gas to the outer peripheral edges, the plurality of nozzles including a first nozzle positioned upstream in the rotational direction and a second nozzle positioned downstream of the first nozzle in the rotational direction;
   a nozzle actuator, disposed on the welding torch and configured to rotationally move the second nozzle in a circumferential direction of the outer peripheral edges; and
   a controller, configured to control an orientation of the nozzle in a direction of decreasing a distance at which the shielding gas jetted from the second nozzle reaches the outer peripheral edges welded by the welding torch.

2. The welding device according to claim 1, wherein
   the controller has a nozzle posture map in which the orientation of the second nozzle is described by a coordinate, at least for each of regions having different curvatures of the outer peripheral edges, in a two-dimensional coordinate system whose origin is a rotation center of the two irregular shaped plates, and
   wherein the controller is configured to control the orientation of the second nozzle based on the nozzle posture map.

3. The welding device according to claim 2, wherein, in the nozzle posture map, the orientation of the second nozzle is represented by an angle between an axis of the second nozzle and a tangential line of the outer peripheral edges facing the second nozzle.

4. The welding device according to claim 1, wherein the nozzle actuator includes an air cylinder, having a piston rod rotatably attached to the second nozzle.

5. The welding device according to claim 1, further comprising:
   a linkage mechanism, configured to bring the second nozzle into close proximity to the outer peripheral edges with change in the orientation of the second nozzle by the nozzle actuator.

6. The welding device according to claim 5, wherein the first nozzle is attached to the linkage mechanism, and the first nozzle is rotationally moved by the linkage mechanism in an identical direction to the second nozzle with change in the orientation of the second nozzle.

7. The welding device according to claim 1, further comprising:
   a pair of heat-resistant covers, being disposed on the plurality of nozzles, and
   the heat resistant covers being oriented, so that the shielding gas jetted from the nozzles crosses front and rear surfaces of the irregular shaped plates and covering a shielding-gas-jetting space from opposite sides.

8. The welding device according to claim 7, wherein
   a nozzle port of the nozzle has a rectangular cross-section, and
   wherein the heat-resistant covers are attached to an outer surface of a partition wall defining the rectangular cross-section and positioned in a direction along the outer peripheral edges.

* * * * *